United States Patent [19]

Tominaga et al.

[11] Patent Number: 4,929,708
[45] Date of Patent: May 29, 1990

[54] EPOXY RESIN COMPOSITIONS

[75] Inventors: Kaoru Tominaga; Tadao Iwata, both of Chiba, Japan

[73] Assignee: Mitsui Sekiyu Kagaku Kogyo Kabushiki Kaisha, Tokyo, Japan

[21] Appl. No.: 935,303

[22] Filed: Nov. 26, 1986

[30] Foreign Application Priority Data

Nov. 26, 1985 [JP] Japan .................. 60-263904
Dec. 27, 1985 [JP] Japan .................. 60-292594

[51] Int. Cl.$^5$ .................. C08G 59/22; C08G 59/50
[52] U.S. Cl. .................. 528/118; 528/104
[58] Field of Search .................. 528/104, 118

[56] References Cited

U.S. PATENT DOCUMENTS

| 2,887,488 | 5/1959 | Smiley | 528/118 |
| 2,965,609 | 12/1960 | Newey | 528/118 |
| 3,505,335 | 4/1970 | Peerman | 528/118 |
| 3,554,956 | 1/1971 | Jones | 528/118 |
| 3,740,373 | 6/1973 | Bentley | 528/118 |
| 4,185,149 | 1/1980 | Waddill | 528/118 |
| 4,188,474 | 2/1980 | Waddill | 528/118 |
| 4,189,564 | 2/1980 | Waddill | 528/118 |
| 4,195,153 | 3/1980 | Waddill | 528/118 |
| 4,298,656 | 11/1981 | Mendelsohn | 528/118 |
| 4,477,646 | 10/1984 | Myers | 528/118 |

FOREIGN PATENT DOCUMENTS 1087166 10/1967 United Kingdom .

Primary Examiner—C. Warren Ivy
Attorney, Agent, or Firm—Wenderoth, Lind & Ponack

[57] ABSTRACT

Disclosed are epoxy resin compositions comprising a 1,1-bis(4-hydroxyaryl) lower alkane type epoxy resin, hydroquinone and a reaction catalyst, or a 1,1-bis(4-hydroxyaryl) lower alkane type epoxy resin and N-aminoalkyl-substituted piperazine or a modified product thereof. These epoxy resin compositions as prepared are in a liquid state and hence resin moldings can be manufactured therefrom by such a simple technique as casting. It is also possible to cure these resin compositions at a temperature below 150° C., and the resin moldings obtained therefrom are tough and excellent in impact resistance as well as in heat resistance.

6 Claims, 1 Drawing Sheet

EPOXY RESIN COMPOSITIONS

FIELD OF THE INVENTION

This invention relates to epoxy resin compositions and more particularly to liquid epoxy resin compositions, from which resin moldings excellent in impact strength can be manufactured by casting technique.

BACKGROUND OF THE INVENTION

Because of such preferable properties as high impact strength and high elongation, thermoplastic resins such as ABS resins and polycarbonate resins are utilized in various fields as molding materials for a variety of purposes, including of course automobiles and household electric appliances. However, where test resin moldings or resin molding products varied in kind but small in quantity are intended to be manufactured by using such resins as mentioned above, for example, ABS resins, no viscosity of the resin adaptable for use in cast molding technique is obtained even when the resins are heated to about 280° C. and, therefore, no desired resin moldings can be manufactured therefrom by the casting technique. Thus, there is left no alternative but to manufacture desired resin moldings from these resin by injection molding or the like techniques. On that account, there was such a problem that the manufacturing of the above mentioned resin moldings from these resins relying on the injection molding or the like molding techniques cannot be exempted from such an economical disadvantage as the use of expensive metal molds or the like.

On the one hand, the aforesaid test resin moldings or resin molding products varied in kind but small in quantity can be manufactured at a very low cost from thermosetting resins such as epoxy resins since these theremosetting resins are in the form of monomers or oligomer when they are molded and are moldable with silicone molds or simple metal molds according to the casting technique. In cured products of thermosetting resins, however, there were involved such problems that the cured products are generally poor in physical properties such as impact strength and elongation, and are found to be fragile, and particularly it was found that it was difficult to obtain resin molding products having an Izod impact strength of higher than 10 kg cm/cm. Mixing thermosetting resins with such flexibility imparting agents as rubber and the like for the purpose of improving the cured products of said thermosetting resins in such physical properties as mentioned above inversely resulted in a further problem that said cured products as obtained thereby are extremely decreased in tensile strength, flexural strength, compression strength, heat resistance or the like properties; finally, according to such procedure no resin molding products can be obtained which are excellent in the balance of various desired physical properties.

In this connection, the specification of British Patent No. 1,087,166 discloses a process for preparing polyether resins having a molecular weight of at least 40,000. According to this patent specification, it is alleged that the desired polyether resins are obtained by reacting bisphenols or divalent phenols with diepoxy compounds in the presence of tertiary amine catalysts. Even the polyether resins as obtained in examples of the specification of this British patent, however, still involved therein such a problem that said polyether resins cannot be said to be excellent in the balance of various physical properties such as impact strength and the like.

OBJECT OF THE INVENTION

The present invention is to solve such various problems as associated with the prior art, and an object of the invention is to provide liquid epoxy resin compositions, from which resin molding products varied in shape can be manufactured by such a simple method as casting technique, said resin molding products being excellent in balance of various physical properties, particularly being tough and excellent in impact strength and, moreover, in heat resistance.

SUMMARY OF THE INVENTION

Epoxy resin compositions of the present invention are firstly those comprising 1,1-bis(4-hydroxyaryl) lower alkane type epoxy resin, hydroquinone and a reaction catalyst.

Epoxy resin compositions of the present invention are secondarily those comprising 1,1-bis(4 hydroxyaryl) lower alkane type epoxy resin and N-aminoalkyl-substituted piperazine or a modified product thereof.

The epoxy resin compositions of the present invention thus comprise 1,1-bis(4-hydroxyaryl) lower alkane type epoxy resin hydroquinone and a reaction catalyst or 1,1-bis(4-hydroxyaryl) lower alkane type epoxy resin and N-alkylamino-substituted piperazine or a modified product thereof. Since these epoxy resin compositions as prepared are in a liquid state, resin molding products can be manufactured therefrom by such a simple method as a casting technique. Furthermore, the present epoxy resin compositions can be cured a temperature below 150° C. to manufacture, according to the above mentioned method, the desired resin molding products which are tough and excellent in impact strength as well as in heat resistance.

DETAILED DESCRIPTION OF THE INVENTION

Figure 1:
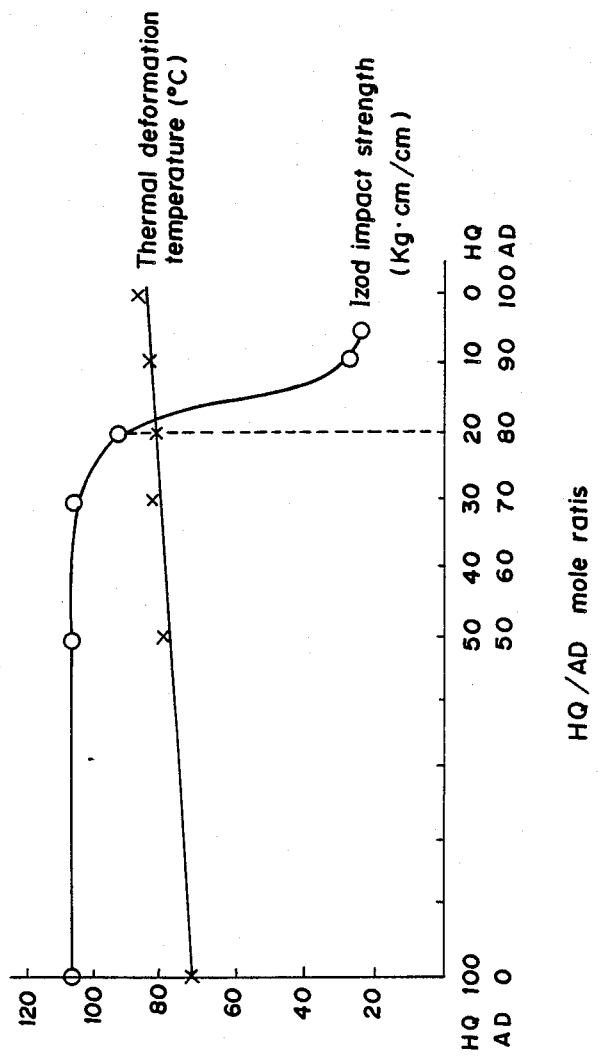
FIG. 1 is a diagram showing the relationship between the measured values of physical properties of resin molding products obtained and the HQ/AD molar ratios, said resin molding products being obtained from epoxy resin compositions comprising 1,1-bis(4-hydroxyphenyl)ethane diglycidyl ether, hydroquinone and a reaction catalyst, in which mixtures of hydroquinone (shown as HQ) and 1,1-bis(4-hydroxyphenyl)ethane (shown as AD) are used at various proportions.

The epoxy resin compositions of the present invention are illustrated below in more detail.

The first epoxy resin compositions as aforesaid are explained, to begin with. These epoxy resin compositions comprise 1,1-bis(4-hydroxyaryl) lower alkane type epoxy resin, hydroquinone and a reaction catalyst.

Preferably used as the 1,1-bis(4-hydroxyaryl) lower alkane type epoxy resin are those which are in a liquid state at an ordinary temperature (25° C.) and which contain lower alkane groups of 2 to 5 carbon atoms. Such epoxy resins used include concretely, for example, glycidyl ether of 1,1-bis(4-hydroxyphenyl) ethane, i.e. 1,1-bis(4-hydroxyphenyl)ethane diglycidyl ether, 1,1-bis(4-hydroxyphenyl)ethane di-$\beta$-methylglycidylether and glycidyl ether of 1,1-bis(4-hydroxyphenyl)propane, i.e. 1,1-bis(4-hydroxyphenyl)propane diglycidyl ether. Of these epoxy resins, particularly 1,1-bis(4-hydroxy)e- thane diglycidyl ether is preferable since the epoxy resin composition prepared by using this epoxy resin is low in viscosity and, moreover, the resin molding product obtained therefrom is excellent in impact strength.

In the epoxy resin compositions of the present invention hydroquinone which is a divalent phenol is used in combination With the 1,1-bis(4-hydroxyaryl)lower alkane type epoxy resin. Under certain circumstances, furthermore, a divalent phenol other than hydroquinone can also be used in combination with the hydroquinone. Usable as the divalent phenol other than hydroquinone includes resorcin, bis(4-hydroxyphenyl)methane, 2,2-bis(4-hydroxyphenyl)propane (so-called bisphenol A), 1,1-bis(4-hydroxyphenyl)ethane (so called bisphenol AD), 2,2-bis(3,5-dibromo-4-hydroxyphenyl)-propane or divalent phenols obtained by reacting divalent phenols with both terminals of epoxy resins which are diglycidyl ethers of the above-mentioned divalent phenols, which dissolve in the aforesaid 1,1-bis(4-hydroxyaryl) lower alkane type epoxy resins. Of these divalent phenols, preferable is 1,1-bis(4-hydroxyphenyl)ethane (so-called bisphenol AD).

Such divalent phenols other than hydroquinone as mentioned above are used in combination with hydroquinone. Where the divalent phenol other than hydroquinone used is 1,1-bis(4-hydroxyphenol)ethane, however, hydroquinone and 1,1-bis(4-hydroxyphenyl)ethane are used in such a proportion that a molar ratio of hydroquinone/1,1-bis(4-hydroxyphenyl)ethane is in the range of from 100/0 to 20/80. The use of 1,1-bis(4-hydroxyphenyl)ethane in an amount exceeding the above range is not preferable as a radical decrease in impact strength (Izod impact strength) of the resulting resin molding product is brought about.

Usable as the reaction catalyst in the present invention are those which dissolve in mixtures of 1,1-bis(4-hydroxyaryl) lower alkane type epoxy resins and hydroquinone and which are capable of acting as reaction catalysts for said mixtures. Concretely, useful reaction catalysts include, for example, quaternary ammonium salts such as benzyl triethylammonium chloride, tetraethyl ammonium bromide, etc., tertiary amines such as N,N-benzyldimethylamine, p-dimethylaminobenzaldehyde, etc., imidazoles such as 2-ethyl 4-methylimidazole, etc., phosphines such as triphenylphosphine, etc., and quaternary phosphonium salts such as triphenylethylphosphonium halide, etc.

The first epoxy resin compositions of the present invention contain the above mentioned components as essential ingredients thereof, wherein 1,1-bis(4-hydroxyaryl) lower alkane type epoxy resins and divalent phenol (hydroquinone, or hydroquinone and divalent phenol other than the hydroquinone) are preferably used in such a proportion that a ratio of hydroxy equivalent of the divalent phenol/epoxy equivalent is in the range of from about 0.8 to about 1.2. The use of the divalent phenol in an amount smaller than the above-mentioned range is not preferable since a molecular weight of the resulting resin molding product decreases and no resin molding product which is tough and excellent in impact strength can be obtained. On the other hand, the use of the divalent phenol in an amount greater than the above mentioned ratio is not preferable since the amount of unreacted divalent phenol present in the resulting resin molding product increases and no resin molding product which is tough and excellent in compact strength cannot be obtained.

The reaction catalyst is preferably used in an amount of 0.01-2% by weight based on the total weight of 1,1-bis(4-hydroxyaryl) lower alkane type epoxy resin and divalent phenol used.

The first epoxy resin composition of the present invention may be prepared by first dissolving the divalent phenol including hydroquinone, while heating to about 50-180°, preferably 80-150° C., in 1,1-bis(4-hydroxyaryl) lower alkane type epoxy resin, and then incorporating the resulting mixture with the reaction catalyst. The first epoxy resin composition of the present invention can also be incorporated further, within the object and scope of the invention, with other epoxy resins, for example, glycidyl ethers aromatic dicarboxylic acids, or other polyvalent phenols, for example, trivalent phenols.

The first epoxy resin composition obtained in this manner is cast in a simple mold, for example, a silicone or epoxy resin mold or an aluminum metal mold, and heated generally at about 100-180° C., preferably about 100-150° C. , for about 1-15 hours, preferably about 3-5 hours, whereby the composition undergoes reaction to form a polymer which give a tough resin molding product. In that case, When a resin molding product to be manufactured has a complicated shape, the reaction may be carried out under reduced pressure in order to prevent occurrence of air-bubble voids in the resulting resin molding product.

As mentioned previously, the first epoxy resin compositions of the present invention as prepared are in a liquid state at an ordinary temperature and can be subjected to casting, and hence the compositions can be molded with a simple mold and, at the same time, the resulting resin molding products are excellent in impact strength, elongation, mold shrinkage factor and dimentional accuracy, and are tough and exhibit well-balanced physical properties. Therefore, the first epoxy resin composition of the present invention can also be used effectively in the field of molding products where polycarbonate resins or the like have heretofore been used.

Furthermore, in the first epoxy resin compositions of the present invention, the characteristic feature thereof, to which stress should be laid, resides in the fact that as the divalent phenol there was used hydroquinone or a mixture of hydroquinone and other divalent phenol. By virtue of this characteristic feature of the present first epoxy resin compositions, the resin molding products obtained therefrom have quite high impact strength in comparison with those obtained from epoxy resin compositions in which divalent phenols other than hydroquinone are used alone.

Next, the second epoxy resin compositions of the present invention are illustrated hereinafter.

The second epoxy resin compositions of the present invention comprise 1,1-bis(4-hydroxyaryl) lower alkane type epoxy resin and N-aminoalkyl substituted piperazine or a modified product thereof.

The 1,1-bis(4-hydroxyaryl) lower alkane type epoxy resins used in the second epoxy resin compositions are the same as the 1,1-bis(4-hydroxyaryl) lower alkane type epoxy resin used in the present first epoxy resin compositions, and particularly preferable is 1,1-bis(4-hydroxyphenyl)ethane diglycidy ether.

In the present second epoxy resin compositions N-aminoalkyl substituted piperazines or modified products thereof are used in combination with the 1,1-bis(4-hydroxyaryl) lower alkane type epoxy resin. Usable as the N-aminoalkyl-substituted piperazined are N-aminoalkyl piperazines or N,N'-bis(aminoalkyl) piperazines, the alkyl group of which is a lower alkyl group having generally 1-6 carbon atoms, preferably 2-4 carbon atoms, particularly preferable are N-aminoethyl piperazine, N-aminopropyl piperazine, N,N'-bis(aminoethyl)piperazine or N,N'-bis(aminopropyl)piperazine.

The N-aminoalkyl substituted piperazines can also be used as modified products thereof and, in this case, usable modifiers therefor include, for example, propylene oxide, n-butyl glycidyl ether, phenyl glycidyl ether, epoxy compounds such as bisphenol A type epoxy resin, acrylonitrile, acrylic esters, maleic anhydride, vinyl compounds such as maleimide, ketone compound such as methyl isobutyl ketone, and compounds capable of reacting with a part (less than 30%) of active hydrogen of N-aminoalkyl substituted piperazines.

By the use of such modified products of the N-aminoalkyl-substituted piperazines, a cure rate of epoxy resins can be controlled, the formation of salt by the reaction of the epoxy resin with carbonic gas present in air can be prevented, or toxicity or skin irritation can be reduced.

The second epoxy resin compositions of the present invention contain the above-mentioned components as essential ingredients thereof, wherein the 1,1-bis(4-hydroxyaryl) lower alkane type epoxy resin and N-aminoalkyl-substituted piperazine or modified product thereof are preferably used in such a proportion that an equivalent ratio of the epoxy group of the former to the active hydrogen of the latter is in the range of from 0.8 to 1.2, preferably from 0.9 to 1.1. The use of these ingredients in a proportion outside the above-mentioned range is not preferable since the proportion of unreacted epoxy or amino groups in the composition becomes excessively high and no resin molding product having sufficient strength and heat resistance is obtained.

In addition to the above-mentioned two essential ingredients, the second epoxy resin compositions of the present invention can be incorporated, if necessary, with diluents, flexibilizer, flame retardants, fillers, and other additives.

The diluents are used for decreasing a viscosity of epoxy resin compounds, and are used usually in an amount of about 20% by weight based on the 1,1-bis(4-hydroxyaryl) lower alkane type epoxy resin. Usable as the diluents are, for example, monoepoxides such as butyl glycidyl ether, aryl glycidyl ether, phenyl glycidyl ether and cresyl glycidyl ether; diepoxides such as polyethylene glycol diglycidyl ether, propylene glycol diglycidyl ether, vinyl cyclohexene dioxide and diglycidyl aniline; and triepoxide such as trimethylol propane triglycidyl ether and glycerin triglycidyl ether.

The flexibilizer which are usable include, for example, polypropylene glycol, polyethylene glycol and carboxy-terminated nitrile rubber, and they are used generally in a proportion of less than about 20% by weight based on 1,1-bis(hydroxyaryl)alkane type epoxy resin.

Usable as the flame retardants are, for example, bromine containing compounds such as dibromocresyl glycidyl ether, tetrabromobisphenol A, tetrabromobisphenol AD and hexabromobenzene, phosphorus containing compounds such as tris(chloro-ethyl)phosphate and tris(dichloropropyl)phosphate, and antimony trioxide.

The fillers are used for the purpose of improving heat resistance, decreasing coefficient of linear expansion, improving heat conductivity and improving dimentional stability, and include concretely inorganic fillers such as silica, talc and calcium carbonate, to which silane coupling agents, anti-foam agents and thioxotropy imparting agents are suitably added.

The second epoxy resin compositions of the present invention may be prepared by simply mixing together the above-mentioned components.

The second epoxy compositions of the present invention obtained in the manner now described are cast in a simple mold, for example, a silicone or epoxy resin mold or an aluminum metal mold, and heated generally at about 20–150° C., preferably about 40–100° C., for about 0.5–5 hours, preferably about 0.5–3 hours, whereby the composition undergoes reaction to give resin molding products which are excellent in heat resistance and tough, and excellent in impact strength. In that case, when the resin molding products are complicate in shape, the reaction may be carried out under reduced pressure in order to prevent the occurrence of air bubble voids in the resulting resin molding products.

As mentioned hereinabove, the second epoxy resin compositions are in a liquid state at an ordinary temperature and can be subjected to casting, and hence they can be molded with a simple mold and, at the same time, the resin molding products obtained therefrom are excellent in such physical properties as heat resistance, impact strength, elongation, mold shrinkage factor and dimentional accuracy, and toughness, exhibiting well-balanced physical properties.

The present invention is illustrated below with reference to examples, but it should be construed that the invention is in no way limited to those examples In the following examples, percentages and parts are by weight unless otherwise indicated.

EXAMPLE 1

In a mixture of 100 parts of 1,1-bis(4-hydroxyphenyl) ethane diglycidyl ether (epoxy equivalent 173, viscosity 3000 cps) as an epoxy resin and 31 parts of hydroquinone therein dissolved at 150° C. was dissolved 0.7 part of a triphenyl phosphine as a reaction catalyst.

The liquid epoxy resin composition thus obtained was cast in a simple silicone rubber resin mold, and said composition was allowed to undergo reaction at 100° C. for 3 hours. After cooling to room temperature, a resin molding product formed in the mold was released therefrom.

EXAMPLE 2

The same procedure as in Example 1 was repeated, except that the amount of the triphenyl phosphines used was increased to 1.4 parts.

EXAMPLE 3

Example 2 was repeated in the same manner as in Example 1, except that a mixture of 9.3 parts of hydroquinone and 42.7 parts of 1,1-bis(4-hydroxyphenyl)ethane was used as a divalent phenol.

EXAMPLE 4

Example 2 was repeated in the same manner as in Example 1, except that a mixture of 15.3 parts of hydroquinone and 30.5 parts of 1,1-bis(4-hydroxyphenyl)ethane was used as a divalent phenol.

EXAMPLE 5

In a mixture of 100 parts of 1,1-bis(4-hydroxyphenyl)ethane di-β-methyl-glycidyl ether (epoxy equivalent 175, viscosity 3400 c.p.s.) as an epoxy resin and 31 parts of hydroquinone therein dissolved at 150° C. was dissolved 0.7 part of triphenyl phosphine as a reaction catalyst.

The liquid epoxy resin composition thus obtained was cast in a simple silicone rubber resin mold, and said composition was allowed to undergo reaction at 100° C. for 3 hours. After cooling to room temperature, a resin molding product formed in the mold was released therefrom.

COMPARATIVE EXAMPLE 1

In a mixture of 100 parts of 2,2-bis(4-hydroxyphenyl) propane diglycidyl ether (epoxy equivalent 190, viscosity 14,000 cps) and 29 parts of hydroquinone therein dissolved at 130° C. was dissolved 1.4 parts of a triphenyl phosphine reaction catalyst.

The liquid epoxy resin composition thus obtained was cast in a simple silicone rubber resin mold, and said composition was allowed to undergo reaction at 120° C. for 5 hours. After cooling to room temperature, a resin molding product formed in the mold was released therefrom.

COMPARATIVE EXAMPLE 2

Comparative Example 1 was repeated, except that a mixture of 14.5 parts of hydroquinone and 30 parts of 2,2-bis(4-hydroxyphenyl)propane was used as a divalent phenol.

The resin molding products obtained in the foregoing examples and comparative example, respectively, were measured, according to JIS K-6911, in physical properties to obtain their respective values as measured were as shown in the following Table 1.

COMPARATIVE EXAMPLE 3

In a mixture of 100 parts of 2,2-bis(4-hydroxyphenyl) propane diglicidyl ether (epoxy equivalent 190, viscosity 14,000) and 60 parts of 2,2-bis(4-hydroxyphenyl) propane therein dissolved at 130° C. was dissolved 0.7 part of a triphenyl phosphine as a reaction catalyst.

The liquid epoxy resin composition thus obtained was cast in a simple silicone rubber resin mold, and said composition was allowed to undergo reaction at 140° C. for 5 hours. After cooling to room temperature, a resin molding product formed in the mold was released therefrom.

COMPARATIVE EXAMPLE 4

The same procedure as in Comparative Example 1 was repeated, except that 31 parts of resorcin was used as divalent phenol.

TABLE 1

| | Heat deflection temperature (°C.) | Notched izod impact strength (kg cm/cm) |
|---|---|---|
| Example | | |
| 1 | 79 | 99 |
| 2 | 74 | 109 |
| 3 | 85 | 108 |
| 4 | 81 | 109 |
| 5 | 77 | 91 |
| Comparative Example | | |
| 1 | 74 | 17 |

TABLE 1-continued

| | Heat deflection temperature (°C.) | Notched izod impact strength (kg cm/cm) |
|---|---|---|
| 2 | 88 | 9 |
| 3 | 93 | 7 |
| 4 | 78 | 9 |

EXAMPLE 6

Examples 3-4 were respectively repeated but by varying the molar ratio of hydroquinone (HQ) to 1,1-bis(4-hydroxyphenyl) ethane (hereinafter indicated as AD), and physical properties of the respective resin molding products obtained were measured to obtain the results as shown in FIG. 1.

From the results thus obtained, no change in impact strength of the resin molding product in the range of HQ/AD=100/0–20/80, whereas a drastic decrease in impact strength is observed with an increasing proportion of AD in the molar ratio.

EXAMPLE 7

A mixture of 100 parts of 1,1-bis(4-hydroxyphenyl)ethane diglycidyl ether (epoxy equivalent 173) and 24.9 parts of N-aminoethyl piperazine was allowed to undergo reaction at 50° C. for 2 hours to prepare a test piece.

EXAMPLE 8

Under heating conditions of 100° C., 9.0 parts of propylene oxide was added dropwise to 100 parts of N-aminoethyl piperazine, and the mixture was allowed to undergo for 2 hours under reflux to prepare a modified aminoalkyl piperazine.

Subsequently, a mixture of 95 parts of 1,1-bis(4-hydroxyphenyl)ethane diglycidyl ether (epoxy equivalent 173), 5 parts of vinyl cyclohexene dioxide (ERL-4206, epoxy equivalent 73, a product of UCC) and 29 parts of the modified aminoalkyl piperazine prepared in the above manner was allowed to undergo reaction at 60° C. for 2 hours to prepare a test piece.

EXAMPLE 9

A mixture of 95 parts of 1,1-bis(4-hydroxyphenyl)ethane diglycidyl ether (epoxy equivalent 173), 5 parts of butyl glycidyl ether and 31 parts of N-aminopropyl piperazine was allowed to undergo reaction at 60° C. for 2 hours to prepare a test piece.

EXAMPLE 10

A modified aminoalkyl piperazine was prepared by treating 100 parts of N-aminoethyl piperazine with 19 parts of propylene oxide.

Subsequently, a mixture of 100 parts of 1,1-bis(4-hydroxyphenyl)ethane diglycidyl ether (epoxy equivalent 173) and 32 parts of the modified aminoalkyl piperazine prepared in the above manner was allowed to undergo reaction at 60° C. for 2 hours to prepare a test piece.

COMPARATIVE EXAMPLE 5

A mixture of 100 parts of 2,2-bis(4-hydroxyphenyl) propane diglycidyl ether (epoxy equivalent 190) and 23 parts of N-aminoethyl piperazine was allowed to undergo reaction at 50° C. for 2 hours to prepare a test piece.

COMPARATIVE EXAMPLE 6

A mixture of 100 parts of 1,1-bis(4-hydroxyphenyl)ethane diglycidyl (epoxy equivalent 173) and 14 parts of triethylene tetramine was allowed to undergo reaction at room temperature for 1 day and then at 80° C. for 2 hours to prepare a test piece.

COMPARATIVE EXAMPLE 7

A mixture of 100 parts of diglycidyl hexahydrophthalate (Epomik R-540, epoxy equivalent 150, a product of Mitsui Sekiyu Kagaku Kogyo K.K.) and 28 parts of N-aminoethyl piperazine was allowed to undergo reaction at room temperature for 1 hour and then at 60° C. for 2 hours to prepare a test piece.

COMPARATIVE EXAMPLE 8

A mixture of 100 parts of 1,1-bis(4-hydroxyphenyl)ethane diglycidyl ether (epoxy equivalent 173), 93 parts of metyl tetrahydrophthalic anhydride (HN-2000, a product of Hitachi Kasei Kogyo K.K.) and 0.2 part of benzyl dimethylamine was allowed to undergo reaction at 100° C. for 2 hours and then at 150° C. for 4 hours to prepare a test piece.

COMPARATIVE EXAMPLE 9

A mixture of 90 parts of 2,2-bis(4-hydroxyphenyl) propane diglycidyl ether (epoxy equivalent 190), 10 parts of butyl glycidyl ether and 36 parts of m-xylene diamine was allowed to undergo reaction at 60° C. for 2 hours to prepare a test piece.

COMPARATIVE EXAMPLE 10

A mixture of 50 parts of 2,2 bis(4-hydroxyphenyl) propane diglycidyl ether (epoxy equivalent 190), 50 parts of carboxyl-terminated nitrile rubber (Highker CTBN 1300×13, a product of Ube Kosan K.K.) and 11 parts of N-aminoethyl piperazine was allowed to undergo reaction at 60° C. for 2 hours to prepare a test piece.

The test pieces respectively prepared in the foregoing examples and comparative examples were measured, according to JIS K-6911, for heat deflection temperature and Izod impact strength(notched) to obtain the results as shown in Table 2.

TABLE 2

| Example | Heat deflection temperature (°C.) | Notched izod impact strength (kg cm/cm) |
| --- | --- | --- |
| 7 | 90 | 17 |
| 8 | 77 | 19 |
| 9 | 84 | 13 |
| 10 | 74 | 18 |
| Comparative Example | | |
| 5 | 105 | 5 |
| 6 | 93 | 2 |
| 7 | 61 | 3 |
| 8 | 105 | 1 |
| 9 | 90 | 2 |
| 10 | <Room temperature | 8 |

What is claimed is:

1. A liquid epoxy resin composition comprising 1,1-bis (4-hydroxyphenyl) ethane diglycidylether and an aminoalkyl piperazine compound selected from N-aminoalkyl piperazines in which the alkyl group has from 1 to 6 carbon atoms and N,N'-bis (aminoalkyl) piperazines in which the alkyl groups have from 1 to 6 carbons atoms, wherein the equivalent weight ratio of the epoxy groups in the composition to the active hydrogen of the aminoalkyl piperazine compound is from 0.8 to 1.2.

2. The epoxy resin composition as claimed in claim 1 wherein the aminoalkyl piperazine compound is N-aminoethyl piperazine, N-aminopropyl piperazine, N,N'-bis(aminoethyl) piperazine or N,N'-bis(aminoethyl) piperazine.

3. A liquid epoxy resin composition comprising 1,1-bis(4-hydroxyphenyl) ethane diglycidyl ether and a reaction product of an aminoalkyl piperazine compound selected from N-aminoalkyl piperazines in which the alkyl group has from 1 to 6 carbon atoms and N,N'-bis(aminoalkyl) piperazines in which the alkyl groups have from 1 to 6 carbon atoms which such an amount of a modifier which reacts with less than 30% of the active hydrogen of the aminoalkyl piperazine compound, whereas the equivalent weight ratio of the epoxy groups in the composition to the active hydrogen of the reaction product is from 0.8 to 1.2.

4. The epoxy resin composition as claimed in claim 3 wherein the aminoalkyl piperazine compound is N-aminoethyl piperazine, N-aminopropyl piperazine, N,N'-bis(aminoethyl) piperazine or N,N'-bis(aminopropyl) piperazine.

5. A liquid epoxy resin composition comprising 1,1-bis(4-hydroxyphenyl) ethane diglycidyl ether and a reaction product of an aminoalkyl piperazine compound selected from N-aminoalkyl piperazines in which the alkyl group has from 1 to 6 carbon atoms and N,N'-bis(aminoalkyl) piperazines in which the alkyl groups have from 1 to 6 carbon atoms with such an amount of a modifier selected from the group consisting of propylene oxide, n-butyl glycidyl ether, phenyl glycidyl ether, a bisphenol A epoxy resin, acrylonitrile, maleic anhydride, maleimide and methyl isobutyl ketone that reacts with less than 30% of the active hydrogen of the aminoalkyl piperazine compound, wherein the equivalent weight ratio of the epoxy, groups in the composition to the active hydrogen of the reaction product is from 0.8 to 1.2.

6. The epoxy resin composition as claimed in claim 5 wherein the aminoalkyl piperazine compound is N-aminoethyl piperazine, N-aminopropyl piperazine, N,N'-bis(aminoethyl) piperazine or N,N'-bis(aminopropyl) piperazine.

* * * * *